Patented Aug. 31, 1954

2,688,033

UNITED STATES PATENT OFFICE 2,688,033

QUATERNARY OCTYLANILINE DERIVATIVES

Joseph B. Niederl, Havana, Cuba

No Drawing. Application September 19, 1950,
Serial No. 185,687

6 Claims. (Cl. 260—458)

This invention relates to octylanilines and their derivatives. More specifically this invention relates to octylaniline in which the octyl group is a di-tertiary octyl group, or 2,4,4-trimethyl-pentyl group or an $\alpha,\alpha,\gamma,\gamma$-tetramethyl butylaniline group, or a "diisobutyl" group, the octylaniline then having the following formula:

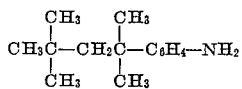

The compound is prepared in several ways. However, in all cases, p-tt-octylphenyl, first discovered by the present inventor [U. S. Patent No. 2,008,032 (July 16, 1935); Ind. Eng. Chem., vol. 30, pp. 1269 (1938)] is the starting material. One way involves direct conversion of the phenol into the corresponding octylaniline by distilling the phenol in the presence of zinc-ammonium complex salt as follows:

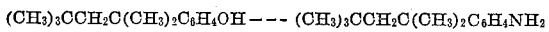

The second involves zinc dust distillation of the same phenol, to produce tt-octyl-benzene, which is nitrated. The nitration product is then reduced to the corresponding tt-octyl-aniline in the conventional manner as follows:

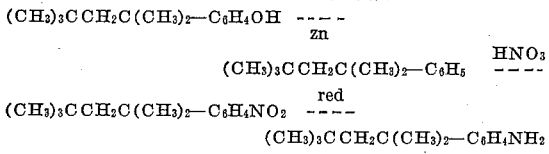

The third way involves hydrogenation of the p-tt-octylphenol and subsequent dehydration of the intermediate cyclohexanol to the tt-octyl-cyclohexene which is further dehydrogenated to the tt-octylbenzene described above. This latter compound is again nitrated and this nitro product reduced to yield the final tt-octyl aniline, essentially as illustrated below:

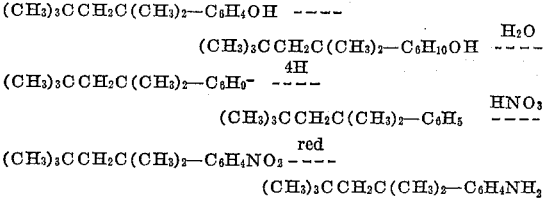

The new p-tt-octyl aniline shows typical aromatic primary amine reactions and together with the stable tt-octyl side chain, with its lipophilic characteristics, shows also a number of surprising and unexpected properties. Chemical transformation of the primary amine groups leads to the formation of a number of medicinally valuable products such as the acetyl, benzoyl and urea derivatives, while the salts, such as the hydrochloride, the sulfate, show capillary activity. Diazotization followed by coupling with aromatic amines or phenols produces the corresponding azo-dye-stuffs with definite lipophilic characteristics.

Exhaustive methylation produces the expected tertiary amine the p-tt-octyl-N,N-dimethyl aniline, which is quaternized to yield a number of industrially important tt-octyl-phenyl-ammonium compounds possessing highly useful properties such as capillary activity, bactericidal and deodorant action, together with unusual lipoid solubilities induced by the tt-octyl group, again, an intramolecular synchronization of desirable properties has been accomplished.

Most important of these new quaternary tt-octyl-phenyl-ammonium compounds are the acid- and alkali stable alkyl sulfates, which may be symmetrical or unsymmetrical depending whether a simple di-alkyl sulfate, such as dimethyl-, di-ethyl-, di-lauryl-, di-myristyl-, di-cetyl- or di-octadecyl sulfate was used in the quaternization reaction, or an unsymmetrical di-alkyl sulfate such as: methyl-ethyl sulfate, methyl-lauryl-, methyl-myristyl-, methyl-cetyl- or methyl-octadecyl sulfate. These compounds correspond to the following structure:

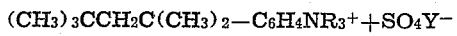

in which R and Y are carbon chains of from 1 to 18 carbon atoms and may be the same or different.

These compounds can be represented generically by the formula:

in which Q is a monovalent radical selected from the group consisting of amino, substituted amino, and quaternary ammonium radicals.

The trivalent nitrogen derivatives can be represented by the formula:

in which Y is a monovalent radical selected from the group consisting of hydrogen, alkyl, aryl and acyl groups.

The pentavalent nitrogen derivatives can be represented by the formula:

in which Z is a monovalent radical selected from the group consisting of hydrogen, alkyl acid aryl groups, and X is a negative ion such as halogen and alkyl sulfate.

Practical uses of these compounds are in cleaning and cleansing procedures, both in household and industrial practices, and in sterilizing and disinfecting and deodorizing compositions. As aromatic properties are still retained, they may be subjected to typical aromatic reactions such as sulfonation, nitration and diazotization, not possible with related aliphatic types of compounds.

*Example 1.—Preparation of p-tty-octyl-aniline*

One mol of 4-tt-octyl-cyclohexene prepared by treating the corresponding cyclohexanol with conc. sulfuric acid [J. B. Niederl and co-workers, Journ. Am. Chem. Soc., Vol. 59, pp. 715 (1937); U. S. Patent No. 2,121,472 (1938)] is dissolved in 500 cc. of benzene, the latter to serve both as a diluent and as a hydrogen acceptor. To this solution is then added 50 grams of nickel-chromium catalyst prepared according to Adkins [Journ. Am. Chem. Soc., vol. 63, pp. 1320 (1941)] and the mixture is then refluxed for nine hours. After this time, the mixture is filtered and is then treated with an equal weight of fuming nitric acid for two hours at room temperature. The reaction mixture is then repeatedly washed with water and the nitration products separated. These latter products are then subjected to fractional distillation at reduced pressure. The final product, the p-tt-octyl nitrobenzene boils at 138–142° at 2 mm.

To one mol of the p-tt-octyl-nitro-benzene as obtained above 500 cc. of conc. hydrochloric acid is added and a total amount of 200 grams of tin in 5 gram portions. The mixture is simultaneously heated on a steam bath for 7–8 hours. After this time the reaction mixture is made strongly alkaline with sodium hydroxide and subjected to steam distillation. The steam distillate is extracted with ether, the ether extract separated and dried over solid sodium hydroxide pellets. After this the ether extract is decanted off, the ether removed by distillation and the residue distilled under reduced pressure. The final product, the p-tt-octyl-aniline is a pale yellow oil, boiling at 103–107° C. at 1 mm. pressure.

The salts of p-tt-octyl-aniline are easily obtained upon treatment of the free primary amine with the respective acids and are crystallized either from water or dilute ethyl alcohol. The hydrochloride melts at 235–238° C., the sulfate 286–288° C. and the oxalate from 145–148° C.

*Example 2.—Preparation of N,N-dimethyl-p-tt-octyl-aniline*

One mol of the p-tt-octylaniline as prepared in Example 1 is dissolved in 500 cc. of ethyl alcohol and the solution refluxed. To this solution is added one mol of methyl iodide and one mol of anhydrous sodium carbonate. After refluxing for two hours, another mol of methyl iodide and of anhydrous sodium carbonate is added and the mixture is allowed to cool and is filtered. The alcohol is then removed from the filtrate by distillation and the residue, after washing with water and drying over solid sodium hydroxide pellets, is distilled under reduced pressure. The final product the N,N-dimethyl-p-tt-octyl-aniline is pale yellow oil, boiling at 115–122° C. at 1 mm. pressure.

Its salts, such as the hydrochloride (M. P. 256–258° C.) and oxalate (M. P. 156–158° C.) are produced in the conventional manner and are then crystallized from hot distilled water or from dilute alcohol.

*Example 3.—Preparation of N-acyl-derivatives of p-tt-octyl-aniline*

One mol of p-tt-octyl-aniline is mixed with one mol of acetic acid anhydride and the mixture heated on a steam bath for about two hours. After this time the reaction mixture is poured into ice water and allowed to stand for 24 hours. The N-acet-p-tt-octyl-anilide first separates out as an oil which slowly crystallizes upon standing, M. P. 63–65° C.

To one mol of p-tt-octyl-aniline 10 cc. portions of benzoyl chloride and 5 gram portions of sodium carbonate are added under constant shaking or mechanical agitation, until a total of 1.1 mols of reactants have been used. Either during the reaction, or afterwards, the reaction mixture is diluted with water and the reaction product allowed to settle. The product is then filtered off and crystallized from ethyl alcohol, M. P. 143–145° C.

*Example 4.—Diazotization of p-tt-octyl-aniline*

One tenth mol of p-tt-octyl-aniline is dissolved in sufficient hydrochloric acid to give a clear solution. To this solution is added in small amounts, one tenth mol of sodium nitrite. One tenth mol of alpha naphthol is then dissolved in a sufficient amount of 10% aqueous sodium hydroxide to form a clear solution. The two solutions are then mixed, the red azo dye, the p-tt-octyl-phenyl - azo - (2-hydroxy)-naphthalene precipitates out.

In a similar manner, also beta-naphthol as well as any other phenol (phenol itself, the cresole, thymol, p-tt-octyl-phenol, resorcinol, etc.) may be used to produce the analogous azo dyestuffs, exhibiting rather unusual solubilities in lipoids and fats.

The azo compounds of the invention may be represented generically by the formula:

(CH₃)₃CCH₂C(CH₃)₂C₆H₄N=NAr in which Ar is an aryl radical such as phenyl and naphthyl.

*Example 5. Quaternization of N,N-dimethyl-p-tt-octyl-aniline*

One tenth mol of N,N-dimethyl-p-tt-octyl-aniline is mixed with 0.1 mol of benzyl chloride and 50 cc. of toluene. The mixture is then refluxed for four hours. After this time the toluene is distilled off under reduced pressure and the residue is crystallized from hot ethyl acetate. The final product the N,N-dimethyl-N-benzyl-N-(p-tt-octyl) phenyl-ammonium chloride melts at 135–138° C., is soluble in water and exhibits capillary activity.

To 0.1 mol of N,N-dimethyl-p-tt-octyl-aniline is added in small portion 0.1 mol of dimethyl sulfate at room temperature. The reaction mixture immediately solidifies. The final product, the N,N,N-trimethyl-N-(p-tt-octyl) phenyl-ammonium methosulfate which forms in quantitative yields, is then crystallized from hot ethyl acetate. The product melts at 165–167° C. is soluble in water and like the above product exhibits capillary activity.

Substituting higher symmetrical or unsymmetrical di-alkyl sulfates for the dimethyl sulfate used in the preceding paragraph, necessitates heating of the reaction mixture for about six hours without a solvent in a steam bath, or refluxing in the presence of an equal volume of toluene. Increasing the alkyl chain reduces water solubility of the compounds, while their solubilities in organic solvents increase correspondingly. All these products show capillary activity.

What I claim is:

1. A quaternary ammonium compound of the formula

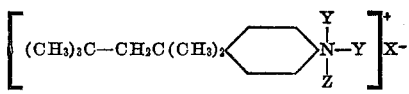

wherein Y is an alkyl group, Z is selected from the group alkyl and benzyl and X is a negative ion.

2. The compound of claim 1 wherein Y is methyl, Z is benzyl, and X is chloride.

3. N,N,N-trialkyl N-(p-tt octyl) phenyl ammonium alkyl sulfate.

4. The compound of claim 3 wherein the alkyl groups are carbon chains of from 1 to 18 carbon atoms.

5. As a new compound N,N,N-tri-methyl-N-(p-tt-octyl) phenyl-ammonium methosulfate.

6. As a new compound N,N-dimethyl-N-ethyl-N-(p-tt-octyl) phenyl-ammonium ethosulfate.

References Cited in the file of this patent

UNITED STATES PATENTS

| Number | Name | Date |
|---|---|---|
| 2,095,457 | Steindorff et al. | Oct. 12, 1937 |
| 2,118,494 | Coffey et al. | May 24, 1938 |
| 2,159,370 | Driesbach | May 23, 1939 |
| 2,161,322 | Steindorff et al. | June 6, 1939 |

FOREIGN PATENTS

| Number | Country | Date |
|---|---|---|
| 850,744 | France | Sept. 18, 1939 |

OTHER REFERENCES

Schuler: Experientia 15, VIII, p. 317.